United States Patent [19]
Eickmann

[11] Patent Number: 4,809,503
[45] Date of Patent: Mar. 7, 1989

[54] SOLID FUEL BAR COMBUSTION DEVICE AND A COMPRESSOR

[76] Inventor: Karl Eickmann, 2420 Isshiki, Hayama-machi, Kangawa-ken, Japan

[21] Appl. No.: 87,845

[22] Filed: Aug. 19, 1987

Related U.S. Application Data

[63] Continuation-in-part of Ser. No. 799,663, Nov. 14, 1985, abandoned, which is a continuation-in-part of Ser. No. 531,512, Sep. 12, 1983, abandoned, which is a continuation-in-part of Ser. No. 64,248, Aug. 6, 1979, abandoned, Ser. No. 338,741, Jan. 11, 1982, Pat. No. 4,480,532, and Ser. No. 224,772, Jan. 13, 1981, abandoned, said Ser. No. 531,512, is a continuation-in-part of Ser. No. 308,203, Oct. 2, 1981, Pat. No. 4,452,411.

[51] Int. Cl.[4] .............................. F02C 3/26
[52] U.S. Cl. .................... 60/39.464; 44/591
[58] Field of Search ............ 60/39.461, 39.464; 44/14, 591

[56] References Cited

U.S. PATENT DOCUMENTS

| | | | |
|---|---|---|---|
| 1,580,656 | 4/1926 | De Coninck | 60/39.464 |
| 3,969,899 | 7/1976 | Nakazawa | 110/260 |
| 3,980,064 | 9/1976 | Ariga et al. | 123/203 |
| 4,049,390 | 9/1977 | Furman | 44/13 |
| 4,300,482 | 11/1981 | Tinkham | 60/39.464 |
| 4,389,218 | 6/1983 | Pike | 44/14 |

OTHER PUBLICATIONS

Lefebvre, Aurther H., *Gas Turbine Combustion*, McGraw-Hill Co., New York, 1983, p. 66.

*Primary Examiner*—Louis J. Casaregola

[57] ABSTRACT

A solid fuel bar preferred to be pressed from cleaned coal powder to a high density is led into a combustion chamber. Air is compressed to high pressure and temperature exceeding the self ignition temperature of the fuel bar and this compressed air is led into a combustion place in the combustion chamber, where the tip of the fuel bar moves into the compressed hot air and ignites and burns therein. The burned and expanded air is led into an expander, which drives the compressor, whereby a running combustion engine is obtained. The invention discloses the details, by which the ignition and combustion of the solid fuel bar in the engine is obtained.

12 Claims, 5 Drawing Sheets

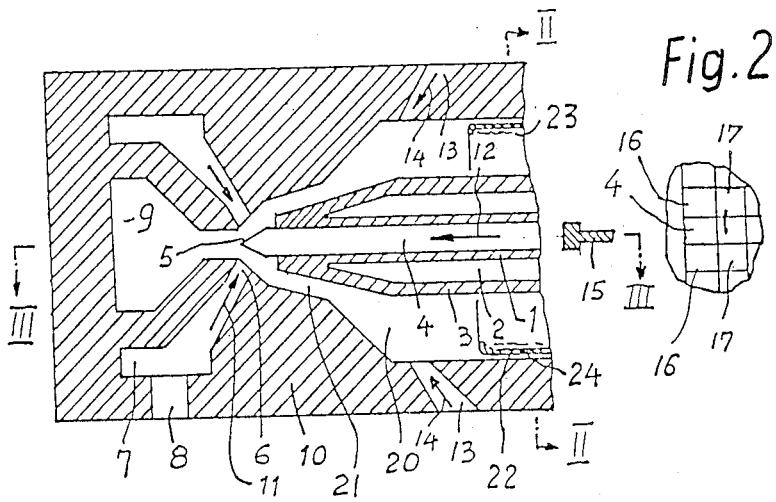
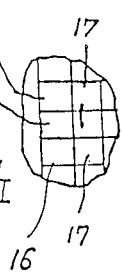
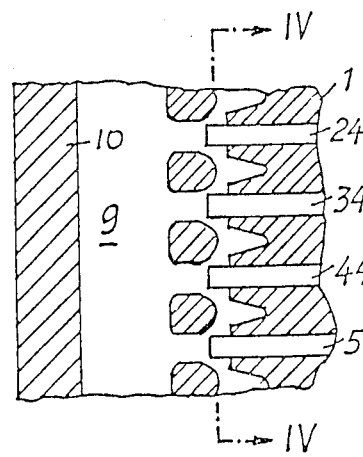
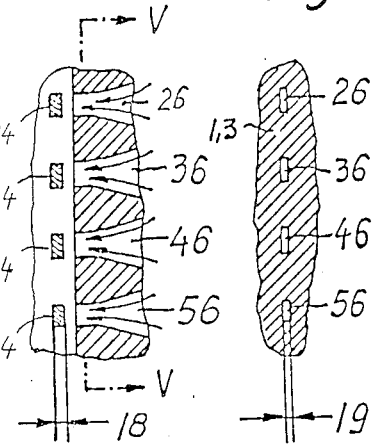

SOLID FUEL BAR COMBUSTION DEVICE AND A COMPRESSOR

REFERENCE TO RELATED APPLICATIONS

This is a continuation-in-part patent application of my co pending application Ser. No. 06-799,663 (abandoned) which was filed on Nov. 14, 1985 as a continuation-in-part application of the now abandoned earlier application Ser. No. 531,512 which was filed on Sept. 12, 1983 as a continuation-in-part application of my at that time co pending patent applications, Ser. No. 064,248, filed on 08-06-79 (abandoned), Ser. No. 338,741; filed on 01-11-82 (U.S. Pat. No. 4,480,532), and of Ser. No. 224,772, filed on 01-13-81 (abandoned). Partial benefits of said filing dates of said serial numbers are partially claimed for the present application. Priority of the patent application No. P - 32 31 808.1 of filing date Aug. 26, 1982 in the Federal Republic of Germany is also claimed for the present patent application. Application Ser. No. 531,512 was also a continuation-in-part of that time co-pending patent application Ser. No. 308,203 which was filed on Oct. 2, 1981, now U.S. Pat. No. 4,452,411; issued on June 05, 1984, whereof benefit is also partially claimed for this present patent application.

BACKGROUND OF THE INVENTION

1. Field of the Invention

The invention is concerned with combustion engines, wherein a compressor supplies compressed air to a combustion chamber, fuel is burned in the hot air in the combustion chamber and an expander is driven by the hot gases, which in turn drive the compressor. More specifically, the invention deals with the creation of a burning place and accessories thereto, wherein a solid fuel bar burns in the compressed air in the combustion chamber.

2. Description of the Prior Art

Around the turn of the century many inventions were made for burning coal powder in a separated combustion chamber between a compressor and an expander. Such patents are for example: U.S. Pat. Nos. 708,236 of Leonhard, 869,781 of Holden and other patents of the time around the year of 1900.

Success in the economy of those engines was, however, rarely reported. However, a very intensive research, development and building and application of coal-powder fuel run Diesel engines has developed during the first 40 years of our century. The leader in this field was Mr. Pablikowski, who obtained many patents and issued many articles in magazines in English, French and German languages.

A very extensive report was given about these happenings by Soehngen and associates by order of the Energy department under title: "Development of coal burning Diesel engines in Germany" during August 1966, (Energy Research and Development Administration) and this very important report can be obtained from: National Technical Information Service, U.S. Department of Commerce, Springfield, Va., 22 161.

There have been some attempts in the former art to burn slurry or cakes from coal powder. For example, the Tinkham U.S. Pat. No. 4,300,482 discloses a carburator in which particles of fuel are abrased from a fuel cake of semi solid fuel.

The U.S. Pat. No. 1,580,656 of De Conninck discloses a supply of powdered semi fluid fuel over a passage into the burning chamber of a permanent combustion engine.

These proposals have several problems, since they fail to use a rigid solid fuel bar at a specified running speed towards the burning chamber in relation to the rate of flow of compressed air into the burning- or combustion - chamber.

Specifically the abrasion of particles from a fuel cake as done by Tinkham can not control the details of abrasion locally and can not secure the direction and speed of flow of the abrased particles of fuel.

Similarly, the drying of semi fluid powdered fuel in the De Conninck Patent close to the burning place does not compress the powder from the slurry into a rigid bar but leaves a column of powder which can spray away in several or in many directions under the influences of pressures and velocities in the combustion chamber.

Thereby both mentioned patents fail to be able to control the local particles of fuel after they have entered into the combustion chamber. Precise and uniform burning of fuel can, consequently, not be obtained by these patents. Further, the cake and the semi fluid fuel of the mentioned patents require big storing spaces because the cake and the semi fluid is a mixture of solid fuel which has a high specific weight with a fluid, like liquid or air, which has a low specific weight. The overall specific weight of the mentioned fuels is thereby too low compared to the desired rigid solid fuel bar fuel of the present invention.

SUMMARY OF THE INVENTION

The aim and object of the invention is, to overcome problems of the engines of the prior art and to provide a reliable engine for the burning of solid fuel bars in a combustion chamber.

In the coal powder burning Diesel engines the problem occurred, that the injection of the coal dust never reached a good perfection. The mixture of coal powder and air was never uniform in the cylinder of the Diesel engine. Consequently, the combustion was uncomplete and unburned coal powder particles ran into the clearance between piston and cylinder, whereby the cylinder wear became high and the exhaust gases contained poisenous matter which polluted the environment.

Therefore, the present invention aims to provide an engine, wherein a fuel bar moves into a burning place at which the fuel bar enters incoming compressed hot air. The air is compressed in such a high ratio, that the temperature of the compressed air is higher than the ignition temperature of the fuel bar. The fuel bar then ignites and burns in the compressed air.

One object of the invention, therefore, is to provide a burning place for a solid fuel bar in hot air.

Another object of the invention is to provide an automatic and continuous supply of hot compressed air to the burning place in combination with the permanent advance of the tip of the solid fuel bar into the burning place for the continuing and permanent combustion of the fuel bar in the compressed hot air.

And, a still further object of the invention is to align the speeds and dimensions of the incoming compressed air, the burning place and the solid fuel bar in order to obtain an almost complete combustion during burning of the fuel in the compressed air, while more objects and aims of the invention may become apparent from the study of the description of the preferred embodiments and the Figures.

An important object of the invention is also, to provide a compressor with reliable and inexpensive ball type valves wherein the neighborhood of the valves is formed by specific configurations of neighboring parts and faces to prevent dead space in the compressor.

MEMORIZATION OF BASIC TECHNOLOGIES

A combustion engine which has a combustion chamber between a compressor and an expander has at least one moveable member in the compressor and in the expander. The mentioned members are mounted together directly or indirectly to move relative to each other in a defined ratio of speeds of the moveable members. For example, in the compressor and the expander reciprocable pistons may move and be combined together by connecting rods and a crankshaft to reciprocate in a ratio of speed. The ratio may be variable or permanent and the ratio may also follow a timed variation respective to the crankshaft. If the engine is a rotary engine, vanes or a trochoidal rotor may reciprocate in slots in a rotor or revolve in a housing and the rotors may be combined over bearings and cams or over a common shaft. If the engine is a turbine engine the compressor may have a revolvable set of compressor blades, the turbine may have a revolvable set of turbine blades and the rotors which carry the mentioned blades may be combined together by a common shaft which revolves with the rotors of the compressor and expander =turbine stage of the engine. The moveable members which are discussed in this application correspond to such members and the ratios of speed to the common coupling device between compressor and rotor.

Fuel is a matter which burns in air or in oxygen. Every fuel has a specific "heating value" or "content of internal energy", which is expressed in Kcal per CC (with CC=cubiccentimeter) or per unit of weight. It can also be expressed in BTU per lbs of weight. An amount of fuel can burn completely in a specific amount of air. This specific amount of air which is needed to burn a respective amount of fuel completely, is called "the equivalence ratio" and hereafter expressed by "lambda =1". If the air supplied to the fuel is too less than required for complete combustion of the fuel, so that the fuel can not completely burn in the amount of air, then the air-fuel ratio "lambda" is smaller than 1.0. If the amount of air supplied is too much for the amount of fuel, then the air-fuel value lambda is greater than "lambda =1.0". Higher values than lambda =1.0 give good efficiencies to the engine. The value "lambda =1.0" gives the biggest power to the engine, and smaller values than "lambda =1.0" give unperfect combustion with resulting poisenous exhausts. A rate of speed compared to another rate of speed gives a ratio. More details of such basic technologies may be obtained from the book "Steam, Air and Gas Power" written by Severns, Degler and Miles and published by Wiley and Tuttle of N.Y. and Tokyo.

The air-fuel ratio "lambda =1.0" for carbon requires 11.5 lbs of dry standard air for 1 lb of carbon and obtains at this ratio 11.5 to 1.0 the mentioned complete combustion of the carbon fuel in the air with $\lambda = 1.0$.

The air-fuel ratio "lambda =1.0" for average gasoline requires 15.13 lbs of dry standard air for one lb of gasoline and obtains at this ratio 15.13 to 1.0 the mentioned complete combustion of the gasoline in the air. These values are taken from the mentioned book, 5 th modern Asia edition, pages 113 and 114.

Considering the specific weight of dry standard air, the above values transform as follows:

The amount of air for air-fuel ratio lombda=1 to burn 1 lb of carbon is 4.26 cubicmeter of air and the amount of air for air-fuel ratio lombda=1 to burn 1 lb of gasoline is 5.6 cubicmeter of air. (with specific weight of air=1.226 Kg per cubicmeter and 1 lb =0.454 kilogram.)

The mentioned "heating value" of carbon is 8,093 Kcal per Kg, 3,674 Kcal per lb, or 14,580 BTU per lb. The heating value of dry Colorado Anthracite is 14,490 BTU per lb (taken from the mentioned book, page 91) or it is 8,037 Kcal/Kg. The heating value of average gasoline is about 19,000 BTU/lb and average gasoline has a specific weight of about 0.78/CC (with CC again cubiccentimeter and with 0.78=gram.) The specific weight of carbon is about 1.8 to 3.5 gram per CC and the specific weight of average anthracite is about 1.52 gram/CC.

CONSIDERATIONS BY THE PRESENT INVENTION

It is possible to cut, for example, a block of the mentioned dry Colorado Anthracite into long bars of square sectional configuration, with, f.e., 1 cm width (breadth and hight). One centimeter length of such bar then has 1 CC volume, a weight of about 1.52 gram and a heating value of $8,037/1,000 = 8.037 \times 1.52 = 12.21$ Kcal. Compared thereto an equal volume of 1 CC average gasoline has a heating value of 19,000 BTU/lb$\times 0.252$ =4,788 Kcal/lb /0.454=10,546 Kcal/Kg =10.540 Kcal/gram $\times 0.78$(specific weight)=8.226 Kcal/CC.

In other words, the heat content of 1 CC of dry Colorado Anthracite is 12.21/8.226=1.48 times higher than the heating value of 1 CC of average gasoline.

Thereby the invention finds, that a car with a given volume of a fuel tank would run 1.48 times farther (give 1.48 times more milage with the same volume of the fuel tank) if the fuel tank would not contain gasoline, but dry Colorado Anthracite instead, and if the Colorado Anthracite could be transformed into burnable fuel and be transportet in the correct air-fuel ratio to the combustion chamber of the engine of the car.

This result may be still further improved for an even better milage, if anthracite or coal would by a preparation become freed of other contents than carbon, and thereafter be pressed to the density of carbon for obtaining the specific weight of carbon. Note that coal can be milled to powder and then become centrifuged to send all non-carbon portions out of the centrically remaining carbon, that the in the middle of the centrifuge remaining carbon can be taken out of the centrifuge and be given under a heavy press to become compressed to the density and specific gravity of solid carbon.

THE SPEED RATIO OF THE INVENTION

From the above considerations it can become calculated with which speed a fuel bar of the invention would have to be moved towards the combustion chamber of the engine. Considering an engine of one liter=1,000 CC volume, and a fuel bar of Colorado Anthracite cut to square-section of 1 cm$\times$1 cm cross sectional area, one obtains for a two stroke engine with 6,000 rpm =100 ups an air volume of 100,000 CC per second flowing into the cylinder of the engine. That gives 100,000 CC =0.1 cubicmeter of air per second. Since the heat value of Colorado Anthracite differs from the heat value of carbon by only 8,037 to 8,093 and since the air-fuel ratio of carbon is (according to the earlier findings) 4.26 cubicmeter of air for 1 pound of carbon or 4.26/0.454=9.38 cubicmeter of air for lambda =1.0 for 1 Kg of carbon, it can be assumed that the air-fuel ratio for lambda =1.0 for Colorado Anthracite is substantially equal to that of carbon. The 100,000 CC =0.1 cubicmeter of air per second in the cylinder of the engine then require 1 Kg×0.1/9.38 =0.01 Kg of dry Colorado Anthracite or 0.01 kg/1.52=0.00701 cubicdecimeter of dry Colorado Anthracite =7.01 CC of dry Colorado Anthracite.

Therefrom follows that 1 CC of dry Colorado Anthracite requires 100,000 CC air/7.01=14,265 CC dry atmospheric standard air.

For the actual burning in the combustion chamber of the present invention, however, the air becomes compressed to at least 50 atmospheres of pressure in order to get a hot temperature of at least 500 degrees centrigrade in order to have a higher temperature than the ignition temperature of the fuel and thereby in order to be able to ignite the fuel.

Considering, accordingly, a compression of the air in the compressor to one twentieth of its free air athmospheric volume, which brings about the required high temperature, the volume of to one twentieth volume compressed air which is required to burn the considered 1 CC of Colorado Anthracite with air-fuel ratio lambda =1 would be 14,265 CC divided by twenty (the compression ratio) =713 CC.

Since the described solid dry Colorado Anthracite block bar has a volume of 1 CC per centimeter of length, it has to advance towards the cylinder of the engine with 7.01 centimeter per second to effect an air-fuel ratio of lombda =1.0 at the combustion in the mentioned cylinder at the mentioned 6,000 rpm of the engine. For a higher than 1.0 lombda air-fuel ratio it has to advance with 7.01/lombda. For different revolutions of the engine it has to advance with the above speed multiplied by the actual revolutions of the engine in rpm divided by 6,000.

At the so obtained lambda =1.0 air-fuel ratio the engine obtains its highest power output. At a higher than 1.0 lombda ratio it obtains a better efficiency and at a lower than 1.0 lombda air-fuel ratio it runs with unperfect combustion and poisenous exhausts.

DEFINITIONS FOR THIS INVENTION

A solid fuel block bar is a rigid, non-powdered, not deformably week and not semi fluid bar of a substantially straight configuration, because it is named a "bar". The adjective "solid" excludes semifluid cakes and powdered or liquided fuel. Such a bar is bordered by a longitudinal outer face or a plurality of such faces with the outer face or faces formed by neighboring longitudinally straight lines. Thereby it can be a round circular longitudinal bar of a circular outer face or the outer face can form a multiangluar outer face of a plurality of straight faces. Thus, the term "longitudinal straight fuel block bar with longitudinally straight outer face portions" includes circular round bars, bars of squared cross-sectional area, bars of rectangular cross-sectional area, of hexagonal cross-sectional area and all other kind of longitudinally straight bars whereof the longitudinally directed outer face remains locally straight throughout the entire longitudinal length and surrounds at the entire longitudinal length an equally formed and dimensioned cross-sectional area.

A "average proportionate to the speed of expansion and contraction of the combustion chamber of the engine moving member of the engine" is commonly in piston engines the crankshaft or any member which moves substantially proportionate to the crankshaft. But it is the rotor of a rotary engine or a turbine shaft of a turbo engine with any member included which moves substantially proportionate to the mentioned rotor or turbine shaft. The adjective "averagely" is used in this definition, since a piston in a cylinder, when controlled by a crankshaft, as in common piston engines, moves not with equal speed per revolution relative to the cylinder but varies its speed continually around a medial speed which is here defined by the mentioned adjective "averagely".

This present invention does not claim a novelty for cutting a cake or semifluid fuel into small portions, but it claims as novel the provision of the solid fuel bar for use as fuel for driving an engine as a fuel in the tank or fuel container of the plant or vehicle.

As far as terms as "gear" or "transmission" are used in this application, they define any type of known gears or transmissions of mechanical action, fluid power action, electric action or the like, if not specificly otherwise defined. Since the details of such known gears and transmissions are obtainable from the publicly available handbooks and service manuals, such gears or transmissions are not illustrated in the present patent application. The term "rigid" is used in accordance with the Merriam Websters Dictionary as defining the quality of being stiff, strict, tense, rigorous, stringent and as lacking flexibility. The term "bar" is used in accordance with the same Dictionary as defining a long, narrow piece of material. The term "block" is used in accordance with the mentioned Dictionary as "a solid piece of substantial material (wood, stone, metall)". The term "straight" is used also in accordance with the mentioned Dictionary and defines "being free from curves, bends, angles, (in longitudinal direction) or irregularities".

USE OF FUEL BARS OF LOWER DENSITY

Fuel bars of lower density of fuel bars of younger natural coal have a lower heat value than carbon or anthracite. The ratio of heat value relative to the heat value of pure carbon may be defined by a decimal fraction of the heat value of an equal amount of pure carbon. If then a fuel bar has a lower content of heat value, the speed of the fuel bar towards the smasher device must then be increased by the speed of a pure carbon fuel bar divided by the decimal fraction of the lower heat value of the actually used fuel bar. If the fuel bar has half the heat value relative to that of carbon, the decimal fraction is 0.50. The speed of the fuel bar must then be set to carbon fuel bar speed / 0.50=2.00 times the speed of the fuel bar of pure carbon. A lower heat value fuel bar results from pressing of the coal powder with smaller force or by imperfect cleaning of the natural coal from non-carbon particles. If the reason is imperfect cleaning, the lower heat content fuel bar may or will cause wearing of pistons in the cylinders and unclean or poisenous exhausts.

THE RELATION OF THE INVENTION TO THE PRIOR ART

The Tinkham U.S. Pat. No. 4,300,482 which was not published and not known, when the first application of the present invention was filed, uses a means to abrasively remove particles from a fuel cake inside of a carburator to mix the abrased fuel particles with air.

The Yellot U.S. Pat. No. 2,805,896 uses powdered fuel for supply to the combustion chamber to burn in the air in the combustion chamber.

And the common Diesel- or gasoline- engines supply a liquid fuel into the combustion chamber to burn in the air therein.

Common to all these known devices is, that the fuel is of less density and heat value per volume than that of carbon or than that of the best known anthracite. Consequently, the heat value of the fuel which can be contained in a fuel container of a given volume, is less than that of pure carbon or of best anthracite. As a result thereof the known engines can operate with a given volume of the fuel container only a limited time with a respective supply of power by combustion of the fuel in an engine.

It is therefore one purpose of the present invention to increase the time of the running of an engine of a given size of the fuel container.

Further, the Tinkham Patent uses a dangerous system, which tends to explosion, since it mixes a combustible matter in a carburator. And the exact control of supply of quantity of fuel powder, as done in the Yellot Patent, is difficult.

Another purpose of the present invention therefore is to use a specifically formed rigid fuel bar which can be transferred towards the powdering mechanism in a very definite speed ratio relative to the supply of air and wherein the solid fuel bar is entirely surrounded along its length by a guide way which prevents mixing of the fuel bar with air to a combustible mixture. The guide way may also be formed by the outer faces or outer face portions of adjacent, neighboring fuel bars.

The M. De Coninck U.S. Pat. No. 1,580,856 uses a semi fluid coal fuel and lets it flow through an orifice into a burning place below an air inflow in a combustion chamber. The semi fluidiness of the fuel prevents the possibility of accuracy of advancement of the fuel towards the burning place and thereby makes it difficult to obtain an air-fuel ratio of lambda =1. An orifice can not meter precisely if no definite pressures exists on both ends of the semi fluid fuel. The semi fluid fuel of the mentioned patent can not be grapsed mechanically for a desired forward movement as a rigid bar can be grapsed. Since the De Coninck patent uses a tank for the storage of the semi fluid fuel the tank would have to be provided with very strong walls in order to permit the application of a high pressure in the tank to force the semi fluid fuel through a nozzle against the high pressure in the combustion chamber. Such high pressure in the tank tends to cause explosion of the fuel in air if the gas used in the tank is not an unburnable gas and the big walls of the tank would prevent the Konink device from being usuable in vehicles. The semi fluid fuel column of the Conink patent can also not prevent that under the high speed of the contrary directed hot air blows particles of the fluid away from the desired meeting place and that in turn prevents perfect lambda =1 combustion at every local place in the burning chamber.

The use of powder instead of semi fluid fuel is even more unperfect and dangerous because coal powder tends to explosion and such explosions have often occured as is also reported in the earlier mentioned Soehngen report. Powder tends even more than semi liquid matter to flow uncontrolled around in the burning place. Its local perfect combustion with air-fuel value lambda 1 is thereby more difficult. Any local derivation from the desired air fuel value in the burning place may result in local combustion with air fuel ratio below lambda 1 and thereby cause unperfect combustion, wearing of members in the engine and so on. Coal powder as fuel in engines is even so difficult that only about a few dozens of coal burning Diesel engines have been built in pre-war and war-time Germany, but a mass application of coal burning engines has never been obtained. The reasons for failure to obtain the general use of coal burning engines appears to be in accordance with this invention the fact, that the forms in which the coal fuel was used, is not suitable, especially the use of powder or of semi fluid cake or coal fuel prevents a perfectly even combustion at equal air-fuel ratio in the burning place and prevents an accuracy of supply of volume of fuel in relation to the volume of the supplied air.

The present invention overcomes these problems by the fuel bar arrangements as described in this application.

One purpose of the present invention is thereby also to overcome the imperfections of the described former art Patents and to provide a combustion chamber or an engine with perfect and complete combustion of solid fuel, especially coal. In order to achieve this aim, the fuel used by the invention is substantially a rigid bar of almost pure carbon or a density of about anthracite and formed as a rigid block bar of longitudinal configuration with an equal and uniform cross sectional area throughout its entire length and with an outer face parallel to the axis of the bar in order that the fuel bar can be precisely subjected to its foreward movement towards the burning place, in order that the outer face of the bar can be sealed to prevent escape of pressure from the burning place along the fuel bar and in order to prevent departure of particles of fuel in the burning place from the cross sectional configuration of the fuel bar to prevent local imperfect combustion.

BRIEF DESCRIPTION OF THE DRAWING

FIG. 1 is a longitudinal sectional view through a combustion chamber of the invention, FIG. 2 is a cross-sectional view through FIG. 1 along the arrowed line II—II of FIG. 1, FIG. 3 is a cross-sectional view through FIG. 1 along line III—III, FIG. 4 is a sectional view through FIG. 3 along the line IV—IV therein, FIG. 5 is a sectional view through FIG. 4 along the line V—V therein, FIG. 10 is a longitudinal sectional view through an embodiment of a compressor of the invention; while

DESCRIPTION OF THE PREFERRED EMBODIMENTS

Figure 6:
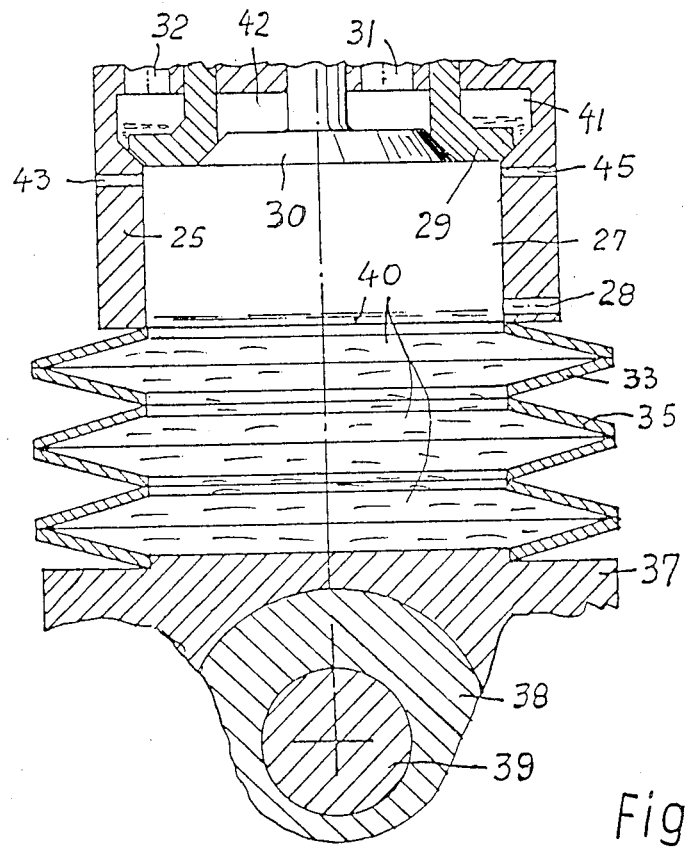
FIG. 6 is a sectional view through another embodiment of the invention.

FIGS. 1 to 5 show sections through a schematic of an embodiment of a combustion engine of my invention, which burns solid fuel bars. The Figures may also demonstrate generally a solid fuel bar combustion arrangement.

Housing 10 is provided with a pre chamber 7, whereinto gas, but preferredly a highly compressed air, is led under high temperature through passage 8. The highly compressed air is compressed in such a high ratio, that the temperature of the compressed air is substantially higher than the ignition temperature of the solid fuel bar. In the case of a combustion engine, it is preferred to utilize a plurality of compressor chambers in succession to press continually compressed air through compressor air passage 8 into pre chamber 7 in housing 10.

At the same time a solid fuel bar 4, which preferredly consists of cleaned and powdered coal which after cleaning and powdering is pressed to a solid block, sheet, tape or bar 4 is led through the fuel guide 1 into the flame space or burning place 5. The fuel guide 1 may be provided with a cooling space 2 in its wall 3.

In accordance with this arrangement of the invention at the respective intervall of time a respective quantity of solid fuel 4 moves into a respective quantity of highly compressed air. The fuel and air meet in the cumbustion place 5, which is the flame place. In detail, the compressed air may move along the arrows in FIG. 1 from the pre-chamber 7 towards flaming point 5, where it enters flaming point 5 through port(s) 6 to meet the tip (front portion) of the solid fuel bar 4. Arrow(s) 11 shows (show) the direction of travel of the compressed and hot air or gas.

When the tip of the solid fuel bar meets the hot air at place 5, it ignites itself in the hot air and burns therein. Thereby the gas expands and can be used to supply power to an expander, wherein the gas expands. The expander may drive a compressor to supply the air.

If the air is less compressed and the compression temperature remains below the ignition temperature of the solid fuel bar 4, the heat in the after chamber 20 may be very high, because it contains burned gas and the high temperature from chamber 20 may then pass to burning place 5 to ignite and burn the solid fuel 4 in the air from inlets 6. Another possiblity for ignition of bar 4 in place 5 would be "man-made" ignition means, like for example, spark plugs or the like. Preferred is however, to compress the air to such high degree, that the temperature of the compressed air exceeds the ignition temperature of the fuel bar 4 to ignite the solid fuel bar in the hot air and to maintain a permanent burning of the fuel bar in place 5 at the continuous movement of compressed air and fuel bar portions into the burning place 5.

The solid fuel bar 4 may consist of any suitable burnable solid. It might, for example, also be wood. Preferred however is, to clean powdered coal from ashes and poisenous substances and to press the so powdered coal into bars 4 of high density. The density of compression should preferredly be so high, that the heat energy per volume unit of coal exceeds the heat value per equal unit of gasoline. See hereto my co-pending application, Ser. No. 531,513. If such pressed coal is used, the ignition temperature is between 200° and 500° C. For heavy good coal, the self ignition temperature lies around 400° C. The ingoing air should be compressed to about 25 atmospheres for light coal -brown-coal- and to 45 or more atmospheres for heavy coal - stone coal - or anthracite. Such highly compressed air is led from the compressor through inlet passage 8 preferred continuously into pre chamber 7 and from there through nozzles 6 into burning place 5 to meet there the tip of the advancing solid fuel bar 4. Commonly the self ignition temperature will be lower than those mentioned here, because the highly compressed air has a high degree of oxygen concentration.

Solud fuel bar 4 is tightly fitted into the fuel bar guide 1 to prevent escape of pressure, gas or air along the outer face of the fuel bar and through a clearance between the fuel bar 4 and the guide 1. Alternatively a seal is provided between the guide 1 and bar 4, if the bar 4 is not closely fitting in the fuel guide 1. Another possibility is, to locate the bar or bars 4 in a chamber under pressure which is equal to the combustion pressure. In such case such a chamber should be sealed from entering compressed air or it should contain a non-burning gas; for example, exhaust gas or cooled exhaust gas. Escape of hot pressurized gas from spaces or chambers 5, 7, 9, 20 should be prevented.

The hot gas will flow from place 5 through passage 21 into after chamber 20 and may continue to burn in places 21 and/or 20, if the combustion is not completed fully in place 5. From chamber 20 the hot gas flows into an expander to give work to the displacement member therein. Chamber 9 may be used as a cushin chamber to soften fluctuations of supply of compressed air from the compressor or to soften fluctuations of the combustion or of the expander's consumption of gas.

It is further preferred to compress the fresh air to a higher pressure than the pressure in place 5 and chamber 20, in order to ensure a steady flow of compressed air through nozzle(s) 6 under the slight pressure difference in spaces 5 and 7, 6. The difference of pressure in chamber 7, with nozzle 6 and burning place 5 or chamber 20 has an influence on the speed of flow through nozzle 6 into place 5 and should be respectively considered and provided.

A further influence to the operation of the arrangement is given by the velocity 12 in the direction of arrow 12 of the solid fuel bar 4.

For control of the burning speed in place 5 or for control of the operational speed of the engine, for example for the control of the speed of a car wherein the engine of the invention is provided, the forward velocity of bar 4 along arrow 12 should be made variable. For example by the provision of a variation device or by connection of the accelerator of the car over a transmission to the thrust arrangement behind the solid fuel bar 4. If no other variable arrangements are available, a variable hydrostatic fluid pump of my patents may be driven to supply a variable amount of pressurized hydraulic fluid against the thrust member 15, whereby the speed and thrust of member 15 against the rear end of the solid fuel bar 4 can be varied. Also an electrical, mechanical or electronic variably speed adjusting means may be provided. By varying the speed of bar 4 along arrow 12 it is possible to let the arrangement burn slower or faster and to run the engine wherein the arrangement is provided with slower or faster rotary velocity.

There are very considerable reasons why my invention preferably is used to burn a solid fuel bar. One of the reasons is to overcome the imperfect combustion of coal powder or coal slurry Diesel engines. Another reason is, that the solid fuel will or can have more heat value per volume of space than the gasoline or petrol has in the equal volume of space. The car which is driven by the present engine can thereby with a tank of equal size drive a longer distance without refueling. The other reason is, that the obtained more perfect combustion reduces ashes and prevents wearing of the cylinder walls of the expander, while at the same time, it is hoped, reduces the amount of poisoneous gas in the exhaust and thereby protects the environment from bad exhaust gases.

In order to obtain these aims however, the correct amount of pressure difference between the pressures in spaces 5, 21, 20 and 7, 6 must be perfect to obtain the correct air speed in place 5. The cross-sectional areas of nozzles 6 and their location and direction must be perfect and the forward speed along arrow 12 must be perfect for advancement of the fuel bar 4 toward space 5. Also the cross-sectional area of the solid fuel bar 4 and its configuration must be perfect. Since the correct values for such parameters are not in all cases known in advance, it is of great help to make the pressure in chambers 7 with nozzles 6 variable and specifically also to make the advance speed of the bar 4 along arrow 12 variable. With such variability the conditions can be more easily adjusted for obtaining of the proper perfect combustion of the fuel 4 in the air from space and nozzle 7, 6.

If for example, the cross-sectional area of the sum of the nozzles 6 and bar 4 is equal, it is estimated, that the speed of the air through nozzle(s) 6 might be about 1800 times faster than the advance speed of bar 4 along arrow 12 if the pressure is about 25 atmospheres. If however the pressure in space 5 is about 50 atmospheres, the speed of the air might be about 800 times faster then the speed of the fuel bar 4 when the mentioned cross-sectional areas of nozzle and fuel bar are equal. These values are, however, only present estimates and it might be that they have to become corrected at actual testing of the device.

It should be noted, that it is not so easy just to send a solid fuel bar into a space 5 with compressed air and just thereby to obtain the desired complete and perfect combustion.

For example, it can happen that the compressed air breaks particles out from the tip of the bar 4 without burning them immediately. Such fuel particles would then continue to flow through passage 21 into space or after burning chamber 20. Therefore a space 21 and a chamber 20 should be provided to permit the after burning of broken away particles of the fuel bar 4 in the remainder of unburned air in these chambers 21 and 20 or in one of them.

It is ideal, however, if the fuel bar is so properly pressed, that no particles can break away and the combustion is forced to occur fully and perfectly in burning space 5.

Here again, it should be considered in accordance with this invention, that such a full and complete burning in space 5 will not at all times occur in place 5 without proper arrangements. For example, the air may flow to local places of lower pressure. The flame in place 5 may burn with different intensity at different local places. The differences in air flow speed and of burning intensity may cause uneven patterns of burning and air flow and thereby prevent the perfect and complete combustion in space 5.

To prevent or reduce such undesired unperfectness of combustion it is preferred in accordance with FIGS. 3 to 5 that a plurality of fuel bar guides 1 are provided to lead plural fuel bars 4 to different local burning places 5. As the Figures show, by way of example, fuel bars 24, 34, 44, 54 may be provided to flow towards burn places 5 before nozzles 26, 36, 46, 56 etc. The arrows in FIG. 4 demonstrate the flow of air through the respective nozzles 26, 36, 46, 56 towards the solid fuel bar tips of fuel bars 24, 34, 44, 54. Thereby the differences of burning speed at different local places are reduced or prevented, because every single nozzle and fuel bar of the plurality of nozzles and bars now obtains equal speeds and pressures and thereby burning speeds. The more bars and nozzles provided, the higher should be the uniformity of burning. Or, a higher plurality will help to soften fluctuations and prevent uncomplete burning and imperfect combustion. FIG. 5 demonstrates, that it is preferred to make the nozzles 26, 36, 46, 56 thin, which means thinner than they are wide, for example, making them of rectangular cross-sectional configuration. FIG. 4 shows, that the cross sectional areas of fuel bars 4, 24, 34, 44, 54 should also be of such rectangular shape. The thinner the nozzles and bars are, as speedier and more complete and perfect will be the combustion and the burning.

In FIG. 2 it might be noted, that the fuel bars 4 are located in a fuel compartment as in my co-pending application Ser. No. 224,772. Bars 16 and 17 are neighboring bar 4. A thrust member 15 lies behind the respective bar 4 and presses it towards the burning place 5 along the direction of arrow 12. When bar 4 is burned, bar 16 will be pressed into guide 3 and continue the earlier duties of now burned bar 4. Thereafter another bar 16 or 17 will be sent by a transporter or by member 15 into guide 3 and through it to the burning place 5.

The importance of the arrangement of the invention may be understood for example, at hand of U.S. Pat. No. 4,300,482 of Tinkham. This patent supplies a solid fuel cake into a combustion chamber. Then it brushes particles away from the cake to burn them. According to the present invention, it is very difficult to maintain for considerable time a brushing mechanism in a hot combustion chamber. And, as the present invention considers, a solid fuel cake will not properly burn in a combustion chamber. Because the hot air would reach only the outer cover, the outer layers of the cake. Only the very thin flow of air would meet the fuel cake; in other words, only boundery layers would react together. Thus, the main amount of compressed air would pass unused through the combustion chamber. Consequently, the present invention discovers the very important matter, that local meeting of fuel and air must be provided and secured, which is done by the arrangement of the fuel guide, fuel bar and the concentrated meeting place of air and fuel bar in the burning place 5. The closeness of nozzles 6 and tips of bars 4 secure a better meeting of thin layers of fuel and of thin layers of compressed hot air. In addition, the meeting speed of the layers can be made variable and be controlled by the invention. Differently thereto the Tinkham patent permits no proper control of the local meeting of abrased fuel particles with the respective local air and consequently, the Tinkham patent has the equal difficulty of imperfect combustion, as the coal powder Diesel engines had, while the present invention reduces such difficulties or prevents them.

FIG. 1 also shows, that injection means 13 may be provided to the combustion chamber or mixing chamber 20. Such injection devices may inject water, steam, additional air or highly heated up water. Because if the engine or chamber would operate with an air ratio "lambda =1" the temperature at the burning place 5 would become very high. Common materials of the walls of chamber 20 might then melt. Consequently, it is often of help to supply water, steam or highly heated up water close to saturation point into the chamber 20 in order to cool the hot gases therein. The cooling of the hot gases takes the cooling from the water or steam, while the hot gases heat up the water and steam it or heat up the steam. In any case the water or steam will thereby obtain a greater volume per weight, because it expands at heating up. Thereby the heated up water or steam supplies an expansion work, which is useable in the expander or for heating houses. Whether an overall efficiency increase or decrease results therefrom may become the content of an investigation in a future application. Basically it is aimed to let the chamber or engine work with not too much losses, but with cooler gases by the supply of water or steam into the chamber(s) 20, 5, 21.

FIG. 1 also shows the rotary pipe or drum 22 in the chamber 20. This drum may contain a layer or revolving cylinder of fluid, for example of water 23. The hot gases may then flow through the interior of the revolving water cylinder 23 in drum 22. The hot gases therein can then not any more heat the walls of housing 10. However, small bores 24 may be provided in the revolving drum 22 to permit a small amount of fluid, steam or water to pass radially or substantially radially out of the revolving fluid bath 23 and out of revolving drum 22 into the space radially outside of the drum 22. The so passing fluid can then be used for an effective cooling of the inner face of the wall of housing 10. The cooling effect provided at this location to the material of the housing will flow inside of housing 10 also to other places, for example to the neighborhood of burning place 5.

The device of FIG. 1 may be connected by passage 8 to a single compressor or to a plurality of compressors and with the exit of chamber 20 to a single expander or to a plurality of expanders. The compressors and expanders may be those of the known art, those of others of my patents or patent applications, or also those of FIGS. 6 to 10 of this application or of some thereof.

To obtain high temperature in the air, the air should be highly compressed. It is therefore suitable to use such compressors, which permit a very high compression of the air. If there remain some unburned solid fuel particles or ashes, they could wear on the cylinder walls and it is therefore suitable to provide pistons which can not wear on the inner faces of the walls of the cylinders.

FIG. 6 therefore demonstrates a water piston in a cylinder. Fluid or water is kept in a chamber or chambers 40 which for example are formed between tapered discs 33, 35. A shaft 39 may carry an eccentic cam ring 38 with an eccentric outer face to guide thereon a piston 37 up and down along an axis of the discs 33, 35. A cylinder 25 is set on top of the uppermost tapered disc 35. The cylinder 25 is provided with inlet valve 30 and outley valve 29. The housing is provided with an inlet passage 31 and an outlet passage 31. A space 41 is located between outlet valve 29 and outlet passage 32. An inlet passage 28 is provided on the bottom of the cylinder wall to fill the chambers 40 between adjacent oppositionally directed tapered rings 33, 35 when the piston or shoe 37 is at the bottommost position. The location of passage 28 thereby controls the amount of filling of the chambers 40 with fluid, preferable low compressible liquid, the best and cheapest being water. The pre pressure from a supercharger or the atmospheric pressure outwards of inlet valve 30 will open the inlet valve 30 and fill the cylinder 25 with gas from an expander, from a combustion chamber or with air from the outside. Valve 30 may therefore also be opened by the pressure of gas in a combustion chamber. For example, by the pressure in chamber 20 of FIG. 1. When the shaft 30 revolves further, the eccentric outer face of eccenter ring 38 thrusts the piston or shoe 37 upwards. The liquid, water, from spaces 40 now enters the cylinder 25 and fills it completely until the bottom faces of the valves 29, 30. Thereby the pressure in cylnder 25 in the air or gas therein, increases and the outlet valve 29 opens upwards to let the air or gas flow out over valve 29 through outlet passage 32. Space 41 may be partially filled with liquid, for example, water, for cooling purposes, if the arrangement of FIG. 6 is used for expanding hot gases from a combustion chamber.

Thus, the water in chambers 40 acts now as a piston to periodically increase and decrease the volume of the cylinder chamber in cylinder 25. Since the water does not wear along the cylinder wall of cylinder 25 as a mechanical piston would do, the wear on the cylinder wall is prevented. Thus, the mechanical piston of the former art is replaced by the fluid piston, preferrably by a water piston. The wearing of a mechanical piston with remainders of solid fuel particles or ashes between the mechanical piston and the cylinder wall is prevented. The water piston of FIG. 6 may either be used as a compressor or as an expander.

Cooling fluid in chamber 41 can not enter into the cylinder 25, since the valve 29 opens only at such times, when the pressure in the cylinder 25 is higher than that in chamber 41. Then, however, a fluid flows from cylinder 25 through the opened valve 29 and through chamber 41 for passing out through passage 32. This upwards flow prevents downwash flow of fluid from chamber 41 into cylinder 25.

Figure 9:
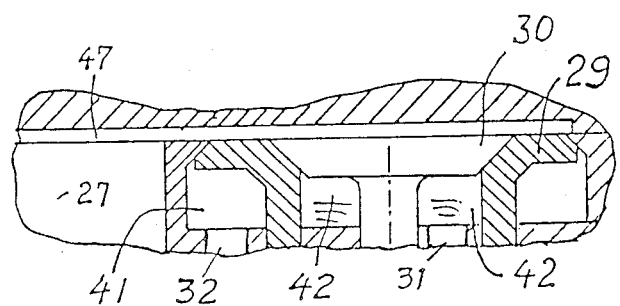
FIG. 9 is sectional view through a portion of an alternative embodiment to FIG. 6.

FIG. 9 demonstrates an alternative arrangement of the upper portion of FIG. 6. The valves 29 and 30 are turned upwards, which means, the axes are turned 180 degrees compared to FIG. 6. A small space 47 is provided above the now uppermost faces of valves 29 and 30. The interior space 27 of the respective cylinder is communicated by passage clearance 47 to the valves 29 and 30. The cooling fluid, if provided, may now be led into space 42 around the inner valve 30 instead of into space 41 as in FIG. 6.

Thereby it is now possible to use selectively either the arrangement of FIG. 6 to provide a water piston, or alternatively the arrangement of FIG. 9. Those parts, which appear in FIG. 6, but not in FIG. 9, are equal to that of FIG. 6 and therefore not repeated in FIG. 9. The alternative arrangements of FIGS. 6 and 9 permit selective leading of cooling fluid to the entrance valve 30 or to the exit valve 29. It is also possible now to use selectively the one or the other of the Figures as a compressor or as an expander. Care must be taken not to run the fluid piston of FIGS. 6 and 9 with too high a speed, in order that the upper face of the liquid remains substantially a plane surface to prevent waves and escape of the fluid which constitutes the piston. The loading with such fluid can be done automatically by setting passage 28 into the right place and hight.

Figure 7:
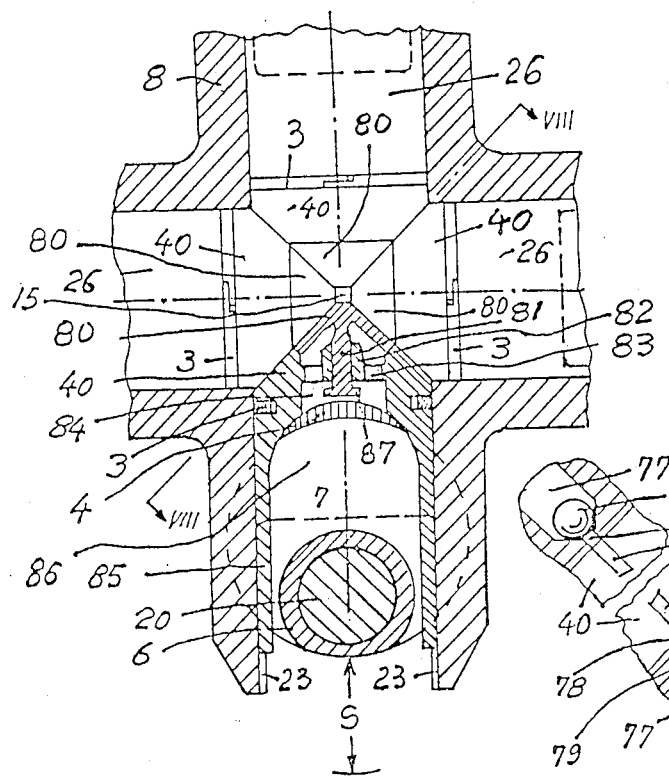
FIG. 7 is a cross-sectional view through a further embodiment of the invention.
Figure 8:
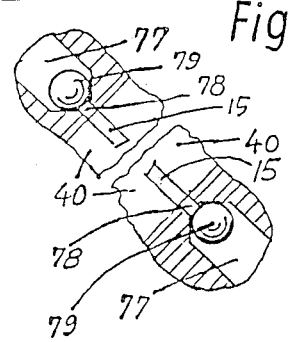
FIG. 8 is a sectional view through FIG. 7 along the line VIII—VIII therein.

FIGS. 7 and 8 deal with improvements to the entrances and exits of chambers. Housing 8 substantially demonstrates the housing 8 of FIGS. 80 to 82 of my co-pending application Ser. No. 483,977, which was filed on Apr. 11, 1983. FIGS. 7 and 8 are thereby an improvement of FIGS. 80 to 82 of my mentioned co-pending patent application. The mentioned FIGS. 80 to 82 are also present in my earlier application Ser. No. 308,202 which is now U.S. Pat. No. 4,452,411. FIGS. 7 and 8 are, therefore, also an improvement of my U.S. Pat. No. 4,452,411.

The mentioned co-pending applications fail partially in the mentioned FIGS. 80 to 82 to explain, how the air can enter into the compressor or expandor chamber 15. The present invention, therefore, provides an inlet valve 80 on top of 40 of the respective piston 85. Valve 80 has a valve shaft 81 which is guided in a guiding portion of piston head 40. A retainer or stopper 87 may be provided to prevent escape of valve 80 from piston head 40 of piston 85. Passages 82 are provided through the guide portion to permit entering of air or fluid from the hollow interior, namely from space 84, in piston 85 into chamber 15, when the valve 80 departs from its seat in piston head 40 of piston 85. The pressure in chamber 15 closes valve 80 at the compression stroke and the under pressure in chamber 15 opens it at the suction stroke, whereby the fresh air is drawn through valve 80 and through piston 85 with head 40 into the compression chamber 15. The perfect inflow of air into the common compression chamber 15 is now secured in accordance with FIG. 7 of the present invention.

That brings the additional feature, that now both axial ends of compression chamber 15 can be utilized to set exit valves 79 on both axial ends of the compression chamber 15. FIG. 8 demonstrates the so obtained two exit valves 79 on passages 78 from chamber 15. When the valves 79 open, the compressed air will flow over valves 79 into passages 77, which may then combine to a common delivery passage. Piston rings 3 may be provided as shown in FIG. 8 on pistons 26. Shafts 20 operate the eccentric cams 6 with end cams 7 to drive piston shoes 4 between the piston's bed and and the respective portion of the outer guide faces of the cam rings.

Figure 10:
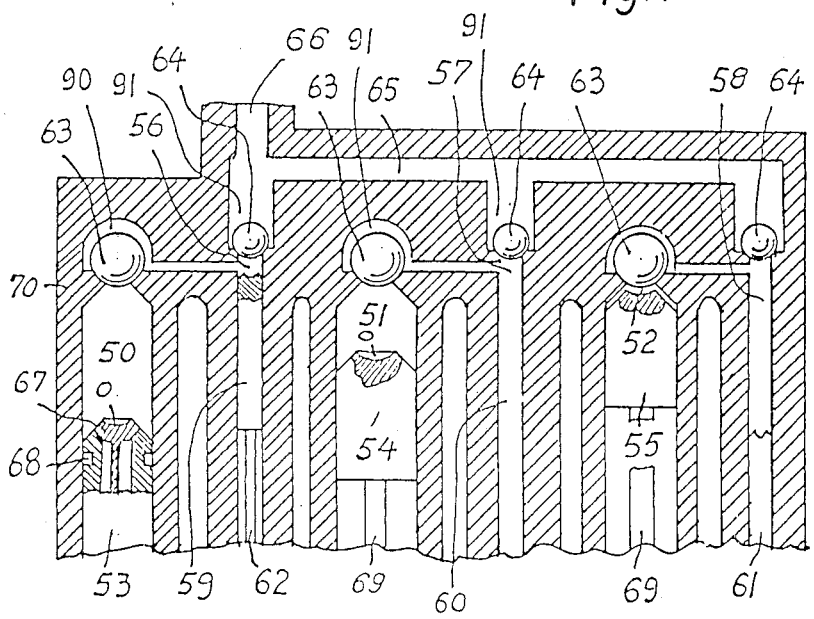

FIG. 10 demonstrates the provision of simple valves in combination with the prevention of dead space in a compressor or expander or in a combustion engine. The device is preferably used as a compressor. Pistons 53 to 55 are successively driven in cylinders 50 to 52 in upwards and downwards strokes. Commonly piston 51 acts after piston piston 50 and piston 52 after piston 51, while piston 50 acts after piston 52 in the upwards stroke, which commonly is the compression stroke. Piston rings 68 may seal between the cylinder and piston. The entire arrangement may be provided in housing 70. The pistons may be driven by conrods 62, 69. The invention now consists therein, that ball formed valves 63 are provided in the valve body on top of the cylinders. The valve balls extend with portions into the cylinders. The invention further provides a specific configuration of the piston tops, which is very important to obtain the dead space elimination of the invention. The piston heads therefore have tapered faces 67 which are complementary to tapered bottom faces of the valve bearing portions on top of the cylinders. The top faces of the pistons further have part hollow ball forms "0", which are complementary to the outer faces of the portions of the valve balls which extend into the cylinders. Thus, when the pistons are moved into the uppermost positions, as shown in the right side of FIG. 10 by piston 55 in cylinder 52, there remains no space between the piston head, the valve 63 and the portion of housing 70 which holds the valve 63. Consequently valves 63 will open only, when the pressure in the respective cylinder is slightly higher than the pressure in the passages 56, 57 or 58 after the respective valve 63. And, since there is no dead space then, all the entirety of the air except perhaps a very minor portion thereof, will be passed out of the respective cylinder over the respective valve 63 into the respective passage 56, 57 or 58. Small spaces 90 or 91 may be provided above the valves 63 to permit the opening of valves 63 and these spaces 90 or 91 are communicated to the compressed air delivery passages 56, 57 or 58 respectively. The Figure further shows, that a second compression to a higher pressure may be provided by second compression pistons 59 to 61 in second cylinders 56 to 58 which communicate with passages 56 to 58 if no inlet valves are provided between passages 56 to 58 and second cylinders 56 to 58. Pistons 59 to 61 have again a similar piston head configuration as the pistons of the first compression stage. Ball valves 64 of the second compression stage are similar to those valves 63 of the first compression stage. The only difference is, that cylinders, pistons and valves of the second compression stage have smaller diameters than those of the first compression stage, since the air is now more compressed to a higher density of less volume. Since the ball valves are rather inexpensive and reliable, the Figure provides an inexpensive and reliable arrangement to prevent dead spaces in a compressor. The efficiency of the compressor is thereby increased and so is its power.

Figure 11:
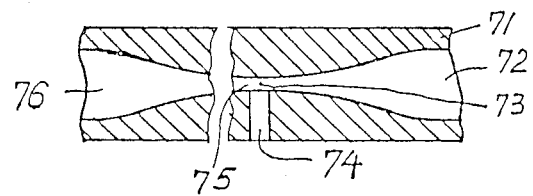
FIG. 11 is a longitudinal sectional view through a nozzle arrangement of the invention.

FIG. 11 demonstrates a ventury type jet or nozzle in which a fluid stream is led from chamber 72 towards chamber 76, while fuel particles of fuel dust or fuel powder are led through passage 74 into the nozzle, which has the flow therethrough from 72 to 76. What counts in accordance with the invention is, that the pressure and speed in the flow from 72 towards 76 in the nozzle 71 should be at the narrow nozzle place 73 in a specific relation to the inflowing fuel particle quantity from passage 74 to mix with each other in a specific ratio in the neighborhood of location 75 in the nozzle 71. Thereby the ratio of mixing, turbulation and flow speed or injection speed through narrow nozzle 75 or through wide nozzle 76 into the respective cylinder or separated combustion chamber of an engine is controlled and obtained. The mixture can thereby become perfected and a good and fast combustion of the fuel portions and the air supplied through the nozzle into the combustion space inside of the combustion chamber or cylinder can be obtained. Instead of leading air through the nozzle also water or steam may be led through the nozzle, depending on whether the engine shall run with air exclusively or also with water injection or steaming in addition to the air supply and burning of fuel in the air in the engine. The pressure to create the flow through nozzle 71 may be taken from a compressor of the present invention or from one of the parental applications.

Figure 12:
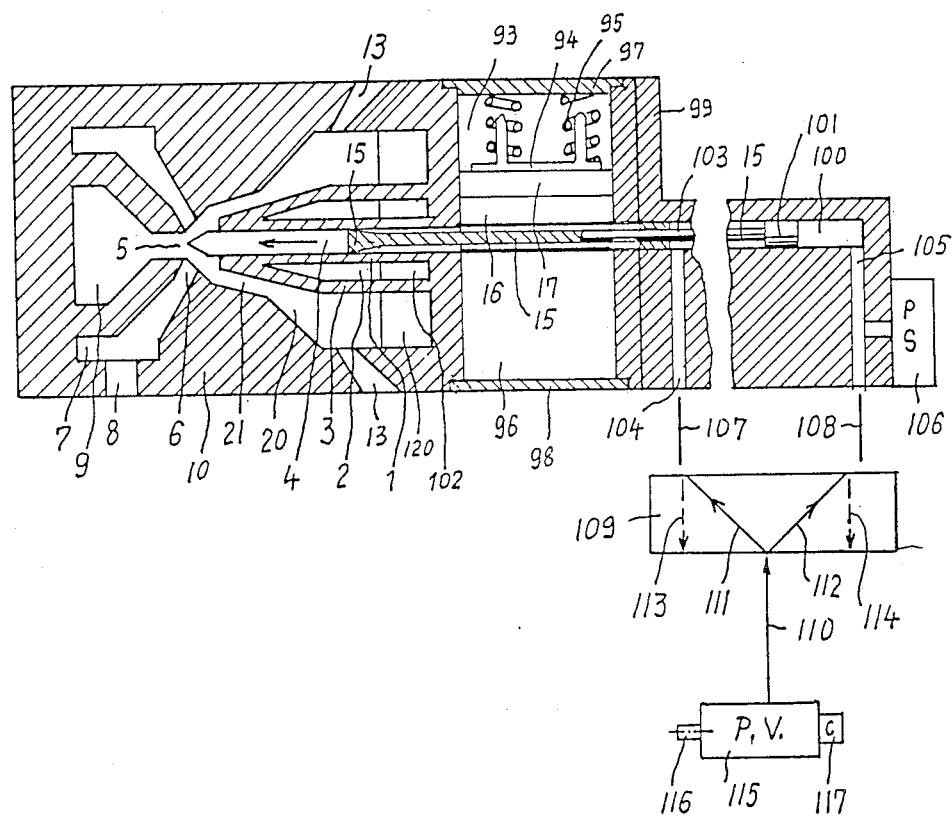
FIG. 12 is a longitudinal sectional view through a portion of a combustion engine and specifically through a combustion chamber as in FIG. 1, however, with an added sectional view through a portion of the fuel bar supply device of this embodiment of the invention.

FIG. 12 contains in its left portion a repetition of FIG. 1. A description of this portion is spared now because it is already known from the description of FIG. 1. In the portion of FIG. 12 which is not present in FIG. 1, the referential numbers 102 and 120 are passages for communications of the chamber portions 102 and 120 of FIG. 1. Added in the right portion of FIG. 12 is the fuel bar container tank or space 93 and the drive arrangement 100, 101, 103, 104, 104 with its accessories for the forward drive of the respective fuel bar towards the burning place 5.

The fuel bar tank 93 is provided with a removeable cover 97 for the entering of the fuel bars 16, 17 into the tank 93. Below the tank may be a storage chamber 96 with a respective removable cover 98 provided. Spring means 95 may be added to the first thruster 94 with this first thruster provided in tank 93 to thrust against the fuel bars 16, 17 in one direction. The second thruster 15 is the thrust member 15 of FIG. 1. In FIG. 12, it is now illustrated that the thrust member 15 extends below the fuel bars 16, 17 into a thrust chamber 100. In this Figure the thrust chamber is a cylinder with front and rear portions 100 and 103 endwards of a piston 101 on the rear end of the second thruster or thrust member 15. Passages 104 and 105 lead to the thrust chamber portions 100 and 103 respectively. A pump or compressor 115 is connected with its shaft 116 to the crankshaft or to another rotary member of the engine. The pump 115 supplies a flow of fluid through line 110 over a directional control valve 109 alternatingly over line 107 and 108 into the respective thrust chamber portion 100 or 103. The pump 115, called "variable pump", "V.P." may be provided with a controller "C" =117 for the control of the rate of flow per revolution of the pump. A pressure responsive valve or pressure senser 106 may be connected to at least one of the fluid passages 104 and/or 105. If the rear piston 101 of thrust member 15 is moved into the end position in one of the thrust chamber portions 100 or 103 the pressure in the respective portion increases and causes the directional control valve 109 to reverse the direction of flow through valve 109 from line 110 into line 107 or alternatively vice versa from line 110 into line 108. Thereby the thrust member 15 is moved either in the one or in the other direction for either thrusting a respective fuel bar 4 towards the burning place 5 or to retract into chamber 100, 103. In the rearmost location the thrust member 15 has fully left the tank 93 and the next fuel bar 16 or 17 is pressed into position before thrust member by springs 95 and the first thruster 94 or is by the own weight of the fuel bar moved into position before the thrust member 15. Thereafter the controller 109 directs the fluid flow from line 110 to flow through line and passage 108, 105 into thrust chamber portion 100 to begin the thrust of the new fuel bar 16, 17 into guide way 1 and towards the burning place 5. Parallel thereto but in timely different sequences, the other fuel bars of FIGS. 3 to 5 may be moved towards their burning places 5 in the same manner as shown in FIG. 12. While a fluid drive arrangement is shown in FIG. 12, it should be understood that also a mechanic, electric of pneumatic drive means my be applied if the same aim is obtained as FIG. 12 obtains it. This arrangement is partially contained in housing portion 99. The pump 115 and the controller 117 may be built as described in my U.S. Pat. No. 3,223,045 or as they are commonly available on the market.

For a better understanding the following matters of geometry, physics and technology are here presented:

A body bordered by straight faces has an outer face or outer faces which is or which are formed by neighboring straight lines. Such a body is either a round bar with a stright axis and a cylindrical outer face with an equal radius around the axis, or it is a body which is formed by a plurality of straight faces which meet in corners. In the latter case the bar has a cross sectional configuration of a triangle, of a square, of a rectangle of of a polygon, like hexagon and so on. In all cases the straight faces are parallel to an axis which goes longitudinally through the body. This is important in respect to the guide way 1 of the present invention because the guide way must be formed complementary in cross section to the cross section of the body of the fuel bar, because the fuel bar should fit closely in the guide way 1 but remain axially moveable in guide way 1. Preferred are square or rectangle fuel bars and guide ways as shown in FIGS. 1 to 5. Since it is clear from the explanation that many cross sectional configurations of fuel bars and guide ways are possible and suitable, a superior term for the many possible configurations has to be used and this superior term which includes all these possibilities is hereafter called "a body which has at least one straight face and exclusively longitudinally straight outer faces, parallel to the axis of the body.

A rigid solid fuel bar differs from a semi fluid fuel column and from a fuel cake therein, that the bar does not fall apart into powder when it is dried, but remains at all times rigidly solid in its original configuration until it is burned or burns in the air in the burning place of the combustion chamber. Such rigid solid fuel bar is pressed of solid fuel, like coal and has a density of at least the specific density of natural heavy coal or anthracite. In practical application of the invention the coal is powdered, cleaned and pressed to a rigid solid fuel bar with a density which exceeds slightly the density of natural coal because natural coal includes air or gas which is removed from the fuel bar of the invention at the preparation process of the fuel bar of the invention.

The air-fuel ratio is known from the combustion engine technology. Fuel requires a specific amount of air for a complete combustion in the air. This air-fuel ratio is called the "air-fuel " ratio "$\lambda=1$" if the amounts of air and fuel are just in the correct ratio for the complete combustion. If the amount of air is greater than required for the combustion of the amount of fuel, the air-fuel ratio exceeds the value "$\lambda=1$" and if the amount of air is too small for a complete combustion of the respective amount of fuel, the ratio is smaller than "$\lambda=1$".

If the fuel-air ratio is $\lambda=1$, the engine obtains the greatest possible power. However, if the air-fuel ratio exceeds $\lambda=1$, the thermal efficiency of the engine increases. For good and perfect combustion the engine should never be run with an air to fuel ratio smaller than "$\lambda=1.0$".

The air-fuel ratio $\lambda=1$ is obtainable from the respective literature for the respective fuels.

It is now preferred to make the fuel bar advancement variable, in order to be able to manage a desired air to fuel ratio in the engine or to vary a previously set air to fuel ratio in the engine. In FIG. 12 that is obtained by making the pump 115 variable by the rate of flow controller 117. The amount of air which is supplied by the engine per each revolution of the crankshaft is known from the volumes of the cylinders. This defines a specific amount of fuel to be supplied by pump 110 at each revolution for an air-fuel $\lambda=1$. If now the engine shall run with a higher air to fuel ratio the delivery quantity or rate of flow supply per revolution of pump 115 should become respectively reduced. This reduction of rate of flow from fuel pump 115 is done by the controller 117 in order to obtain the higher air to fuel ratio in the engine.

With the above explanations, which are commonly known to every educated engineer, the following features of the engine of the invention will be understood:

(a) The engine uses a fuel of higher specific density than that of gasoline, fuel cakes or semi fluid slurries, whereby it storages more energy per given space of tank than the engines of the former art and can drive a vehicle farther or supply energy longer, and;

(b) The engine obtains a perfect combustion with little poisonous gases because it prevents the uncomplete local mixing of fuel and air which is unavoidable in gasoline engines, semi fluid or fluid cake engines, since in the present new engine of the invention the fuel bar remains rigidly solid until its respective upper layer of the fuel bar tip is burned in the air. Departure of small powder, slurry or gasoline particles or drops from the desired locations in the air are, thus, prevented in the present invention and the uncomplete combustion of gasoline - semi fluid - or powder - cake engines of the former art which led to poisonous exhausts and waste of portions of fuel, are prevented by the present invention.

ADDITIONAL EXPLANATIONS TO LANGUAGE-TERMS

The previous examination of the language of this Patent specification has led to the assumption, that "rigid" can not mean "undeformable", since every body is deformable when subjected to high forces against it. Even that is correct, there appear to be no other suitable terms in the english language. F.e., "firm" could mean "fixed in place". "Fixed" could means "unmoveable from the place where it is fixed". Under these circumstances, the word "rigid" as used in this specification, shall mean that the fuel bar is substantially "unflexible" and "undeformable" at the state of condition in which it is used in the device of the invention. Thus, while a solid carbon bar or anthracite bar will be deformable under pressures of several thousand atmospheres, it will not be substantially deformable laterally under the pressures of 50 to 200 atmospheres to which the bar is subjected in the device of the invention.

On the contrary thereto, a semi fluid coal powder cake has rigid particles of powder which in themselves are rigid, but one of the particles is moveable relative to a neighboring particle and thereby the semifluid cake is deformable since it consists of individual rigid particles which can move relative to each other. Thus, a semi fluid coal cake is not a rigid bar in the sence of the present application. That does, however not exclude that the word "rigid" in former art Patents is wrong, because in the former art Patents, the word "rigid" assumes the individual coal powder particles as rigid contrary to liquidious or gaseous. Since in semi fluid coal cakes or in coal powder, especially when the powder moves from a larger cross sectional area of a column through a smaller sectional area orifice, the coal powder or coal cake column is not rigid, even the individual particles in it as far as they consist of coal, are rigid. The column as an entire column, cake or mountain of powder, is not rigid, but deformable since the individual particles in it are not fixed relatively to each other.

Thus, rigid coal fuel cake or column differs from a rigid coal fuel bar therein, that in the column or cake, the individual particles are not fixed, but moveable relatively to neighboring particles, while in a rigid coal fuel bar or rigid carbon fuel bar the individual particles are fixed relatively to each other, which includes fixed to neighboring particles. Thus, a column or cake of coal fuel is not rigid, but a coal fuel bar is rigid and not deformable and not flexible if used in a burning place or combustion engine of pressures below about 200 atmospheres. Therefore, the word "rigid" is not singularly used in this specification, but in combination with "bar" as "rigid fuel bar".

The invention is partially still further described in the appended claims and the claims are therefore considered to constitute a portion of the description of the preferred embodiments of the invention.

What is claimed is:

1. A combustion chamber which has in a housing at least one airflow passage for the continuous supply of compressed air to a combustion place in combination with a fuel supply arrangement and ignition means to supply fuel into said combustion place and to ignite said fuel in said air in said combustion place, wherein said fuel supply arrangement comprises, in combination, a fuel container with a storage space, a transfer mechanism and longitudinally straight rigid fuel bars of equal cross sectional configuration throughout their entire lengths from their front tips to their rear ends, with said fuel bars having at least the same density and heating value as an average grade of anthracite, wherein said transfer mechanism includes a linear guide way with at least one linear inner face which meets at least one linear outer face of a fuel bar for guidance of said fuel bar at longitudinally forward movement of said fuel bar, wherein said transfer mechanism includes a linearly moving member, wherein said linearly moving member touches the rear end of at least one of said fuel bars to move the respective fuel bar forward in said linear direction and through said guide way to cause said fuel bar to meet with its front tip said compressed air in said combustion place for burning in said combustion place, wherein a compressor is communicated to said airflow passage to supply in a continuous operation in average a first volume per unit of time of compressed hot air of a temperature exceeding the self-ignition temperature of said fuel of said fuel bar, wherein the forward speed of said linear movement of said fuel bar towards said combustion place per equal unit of time defines by the cross sectional area of said fuel bar multiplied with said forward speed a second volume with said second volume consisting of fuel, and, wherein said first volume consists of the minimum of quantity of air which is required to burn said second volume which consists of fuel in said first volume of air completely.

2. The combustion chamber of claim 1, wherein said ignition means is provided by said temperature of said compressed air, which exceeds said self-ignition temperature of said fuel of said fuel bar.

3. The combustion chamber of claim 1, wherein said fuel bar has a heating value per unit of volume which requires a specific volume of air for complete combustion of said volume of fuel in said volume of air.

wherein said specific amount of air is defined as the air-fuel equivalence ratio "lambda =1", wherein said first volume consists substantially of air while said second volume consists substantially of fuel, and, wherein said said first and second volumes continuously operate with supply speeds towards said burning place which constitute and maintain a rate of said first volume to said second volume which substantally corresponds to said air-fuel equivalence ratio lambda =1.

4. The combustion chamber of claim 3, wherein said heating value of said fuel bar exceeds the heating value of an equal volume of kerosene by the factor "beta" whereby said equivalence ratio "lambda" becomes "lambda =beta multiplied with gamma" if gamma is the air-fuel stoichimetric air-fuel value of kerosene, and whereby the reciprocal of said stoichiometric air-fuel value of kerosene is the stoichiometric fuel-air value of kerosene.

5. The combustion chamber of claim 4, wherein the rate of air of said first volume to the fuel of said second volume is variable from said "lambda =1" to "lambda =4" with "lambda =4" being four times the volume of air of said "lambda =1" by variable reduction of said supply speed of said fuel bar from the speed which corresponds to the speed of said "lambda =1" to a four times slower speed of said forward speed of said fuel bar.

6. The combustion chamber of claim 1, wherein said compressor contains in a stationary housing a plurality of relative to said housing moveable members whereof at least one is subjected to create and maintain said flow of air, wherein a transmission is provided between one of said moveable members and said transfer mechanism to drive said transfer mechanism in dependence on said moveable member of said compressor and thereby to maintain a proportionateness between said air flow and said movement of said fuel bar in said linear direction.

7. The combustion chamber of claim 6, wherein said fuel bar consists of coal with a heating value which requires a specific amount of air for complete combustion of said fuel in air.

wherein said specific amount of air is defined as the equivalence ratio lambda =1, wherein said proportionateness which is provided by said transmission is provided to maintain said equivalence ratio lambda =1 between said first and second volumes and thereby between said flow of volume of hot air and said foreward speed of said movement of said fuel bar, and;

wherein said first and second volumes continuously operate with supply speeds towards said burning place which constitute and maintain a rate of said first volume to said second volume which corresponds to said equivalence ratio lambda =1.

8. The combustion chamber of claim 7, wherein the rate of said first volume to said second volume is variable from lambda =1 to lambda =4 by variation of said forward speed from said speed which corresponds to the speed of said lombda =1 to a four-times slower speed of said forward speed of said fuel bar, while said transmission is a variable transmission which includes a controller for the variation of the outgoing speed of said transmission and thereby of said foreward speed of said fuel bar, whereby it is provided that said rate of said first volume to said second volume is variable.

9. The combustion chamber of claim 6, wherein said combustion chamber forms a nozzle, wherein said air flow passage ports into said nozzle to lead said volume of air through said nozzle, and, wherein said forward movement of said fuel bar is directed into said nozzle, whereby the meeting of said front tip of said fuel bar with said nozzle defines the center of said combustion place.

10. The combustion chamber of claim 9, wherein said compressor compresses that air to at least fifty atmospheres to heat said air to at least 500 degrees centigrade, wherein said fuel bar consists of anthracite cut to a longitudinal bar with equal cross sectional area throughout its entire length with an outer face parallel to the longitudinal axis of said bar, wherein said fuel bar contains a heating value of approximately 8,000 Kcal per cubicdecimeter, wherein said air is compressed to approximately one twentieth of its original free uncompressed atmospheric volume, wherein said lambda =1 ratio defines that one cubic centimeter of said fuel bar requires approximately 713 cubic centimeters of hot compressed air at one twentieth of its free uncompressed state, wherein the cross sectional areas of said fuel bar and of said nozzle are one square centimeter, and, wherein to operate in said equivalence ratio lambda =1 said forward speed of said fuel bar is approximately one sevenhundredthirteenth of the speed of said air flow in said nozzle and wherein said speed of said airflow in said nozzle is approximately 713 times higher than the forward speed of said fuel bar towards said nozzle.

11. The combustion chamber of claim 8, wherein if said variable transmission for the variation of the air-fuel ratio is provided, said speed or said cross-sectional area of said fuel bar is reduced in a ratio equal to the used ratio outgoing speed reduction of said transmission.

12. The combustion chamber of claim 9, wherein said fuel bar consists of a fuel bar which is compressed from carbon which is obtained from coal which is substantially freed from non-carbon particles.

* * * * *